(12) United States Patent
Yamaura et al.

(10) Patent No.: US 8,910,671 B2
(45) Date of Patent: Dec. 16, 2014

(54) APPARATUS FOR SUPPLYING ELECTROLYTE

(75) Inventors: Seiji Yamaura, Ueda (JP); Kenichi Hirai, Ueda (JP)

(73) Assignee: Nagano Automation Co., Ltd., Ueda-Shi, Nagano (JP)

( * ) Notice: Subject to any disclaimer, the term of this patent is extended or adjusted under 35 U.S.C. 154(b) by 373 days.

(21) Appl. No.: 13/519,423

(22) PCT Filed: Dec. 27, 2010

(86) PCT No.: PCT/JP2010/007571
§ 371 (c)(1),
(2), (4) Date: Oct. 3, 2012

(87) PCT Pub. No.: WO2011/080918
PCT Pub. Date: Jul. 7, 2011

(65) Prior Publication Data
US 2013/0025741 A1 Jan. 31, 2013

(30) Foreign Application Priority Data
Dec. 28, 2009 (JP) .................................. 2009-298357

(51) Int. Cl.
*H01M 2/36* (2006.01)
*H01M 10/04* (2006.01)

(52) U.S. Cl.
CPC .............. *H01M 2/36* (2013.01); *H01M 10/0404* (2013.01)
USPC ...................... 141/1.1; 141/8; 141/32; 141/65

(58) Field of Classification Search
CPC ........ H01M 2/36; H01M 2/361; H01M 2/362
USPC ...................................... 141/1.1, 5, 8, 32, 65
See application file for complete search history.

(56) References Cited

U.S. PATENT DOCUMENTS 2,771,101 A * 11/1956 Thompson ....................... 141/57
3,372,716 A * 3/1968 Hommel et al. ................. 141/59
(Continued)

FOREIGN PATENT DOCUMENTS

| JP | 60-050858 A | 3/1985 |
| JP | 5-325944 A | 12/1993 |

(Continued)

OTHER PUBLICATIONS

Extended Search Report issued Jun. 10, 2013, by the European Patent Office in corresponding European Patent Application 10840777.6 (4 pages).

(Continued)

*Primary Examiner* — Nicolas A Arnett
(74) *Attorney, Agent, or Firm* — Buchanan Ingersoll & Rooney PC

(57) ABSTRACT

An apparatus that supplies electrolyte inside a battery case disposed inside a reduced pressure chamber includes: a measuring unit where a piston moves in a first direction in a measuring space (S) inside a cylinder, a dispenser that injects electrolyte from above into a battery case, a first pipeline that connects an upper end portion of the measuring space (S) of the measuring unit and the dispenser, and a back pressure valve disposed on the first pipeline. The dispenser includes a discharge nozzle disposed inside the battery case or in a periphery of an upper end of the battery case, a needle valve that is disposed inside the discharge nozzle and opens and closes the discharge nozzle, and an actuator that drives the needle valve up and down.

11 Claims, 2 Drawing Sheets

(56) References Cited

U.S. PATENT DOCUMENTS

| | | | |
|---|---|---|---|
| 3,556,175 A * | 1/1971 | Wolf et al. | 141/285 |
| 3,911,972 A * | 10/1975 | Hubers et al. | 141/7 |
| 5,512,160 A | 4/1996 | Lim | |
| 5,731,099 A * | 3/1998 | Badger et al. | 141/59 |
| 6,497,976 B1 * | 12/2002 | Morizane | 141/59 |
| 6,588,461 B2 * | 7/2003 | Morizane | 141/61 |
| 6,706,440 B1 * | 3/2004 | Takimoto et al. | 141/8 |
| 7,049,026 B2 * | 5/2006 | Muneret | 141/65 |
| 8,047,241 B2 * | 11/2011 | Reschke | 141/302 |
| 8,286,676 B2 * | 10/2012 | Ianniello | 141/198 |
| 2003/0064280 A1 * | 4/2003 | Morizane | 429/80 |
| 2009/0242073 A1 * | 10/2009 | Reschke | 141/7 |

FOREIGN PATENT DOCUMENTS

| | | |
|---|---|---|
| JP | 2004-55238 A | 2/2004 |
| JP | 2004-247120 A | 9/2004 |
| JP | 2007-213816 A | 8/2007 |
| JP | 2008-059973 A | 3/2008 |

OTHER PUBLICATIONS

Notification of Transmittal of Copies of Translation of the International Preliminary Report on Patentability (Chapter I or Chapter II)(PCT/IB/338), International Preliminary Report on Patentability (Form PCT/IB/373) and the Written Opinion of the International Searching Authority(Translation)(Form PCT/ISA/237) issued on Aug. 23, 2012, in corresponding International Application No. PCT/JP2010/007571. (6 pages.)

*International Search Report (PCT/ISA/210) Issued on Mar. 8, 2011, by the Japanese Patent Office as the International Searching Authority for International Application No. PCT/JP2010/007571.

* cited by examiner

APPARATUS FOR SUPPLYING ELECTROLYTE

TECHNICAL FIELD

The present invention relates to an apparatus and method for supplying electrolyte into a battery case.

BACKGROUND ART

During a process that supplies electrolyte (liquid electrolyte) into a battery vessel, the battery vessel is placed in an evacuated atmosphere (i.e., a reduced pressure atmosphere or decompressed) so as to reduce the time taken for the electrolyte to permeate.

Japanese Laid-Open Patent Publication No. 2008-59973 discloses a filling method for a lithium secondary cell including: a step of evacuating a battery case to a vacuum in a range of −70 kpa to −95 kpa below the boiling point of an organic electrolyte; a step of evacuating a temporary storage chamber inside a filling hopper, into which a specified amount of organic electrolyte has been introduced, so as to produce a pressure that is 0.1 kpa to 5 kpa higher than the pressure inside the battery case; and a step of opening a filling hole in the filling hopper and using the pressure difference to fill the battery case with the organic electrolyte from inside the temporary storage chamber via the filling hole and filling nozzles connected thereto.

DISCLOSURE OF THE INVENTION

To reduce the time ("filling time") taken to introduce electrolyte into a battery vessel (or "battery case"), techniques such as placing the battery case under negative pressure, dividing the filling operation into specified amounts of electrolyte (hereinafter "divided filling"), and divided filling in a negative pressure atmosphere have been used. With all of such techniques it is important to suppress dispersion of the electrolyte and to maintain a high filling precision.

One aspect of the present invention is an apparatus (supplying apparatus) supplying liquid electrolyte inside a battery case (vessel) disposed inside a reduced pressure (decompression) chamber. This apparatus includes a measuring unit where a piston moves along a first direction in or through a measuring space inside a cylinder; a dispenser that injects electrolyte from above or upper side into a battery case; a first pipeline that fluidly connects an upper end portion of the measuring space of the measuring unit and the dispenser; and a back pressure valve disposed on the first pipeline. The dispenser includes: a discharge nozzle disposed inside the battery case or in a periphery of an upper end of the battery case; a needle valve that is disposed inside the discharge nozzle and opens and closes the discharge nozzle; and an actuator that drives the needle valve up and down.

Another aspect of the present invention is a method including supplying electrolyte inside a battery case (vessel) disposed inside a reduced pressure chamber using the supplying apparatus described above. Supplying the electrolyte includes the following steps.

Injecting, with a control unit driving the piston to apply a back pressure to the back pressure valve, the electrolyte into the battery case inside the reduced pressure chamber from the upper end portion of the measuring space via the back pressure valve of the first pipeline and the needle valve.

Closing, with stopping the piston, the back pressure valve.

The battery case (vessel, package) into which the electrolyte (liquid electrolyte, electrolytic solution) is supplied (injected, filled in stages) is disposed inside a reduced pressure chamber. The electrolyte is supplied from outside the reduced pressure chamber, typically from an atmospheric pressure atmosphere. To suppress dispersion of the electrolyte, instead of injecting the electrolyte under pressure using a pump or the like, the electrolyte is injected into the battery vessel using the pressure (static pressure, hydraulic pressure) of a liquid column. However, at the injection opening into the battery case, the difference in pressure due to the pressure inside the chamber in which the battery case is enclosed being reduced acts in addition to the static pressure of the electrolyte, resulting in the electrolyte being strongly drawn into the reduced pressure chamber. For this reason, it is difficult to control the filling amount. In addition, it is difficult to stop leaking (dripping) from the injection opening. That is, the shutting off of electrolyte is poor. The inventors of the present disclosure found that the time taken for dripping to stop due to the factors described above is one reason why it is difficult to reduce the filling time.

In the supplying apparatus (filling apparatus) according to one aspect of the present invention, the measuring unit is disposed upstream of the dispenser and the upper end portion of the measuring space is connected to the dispenser. Accordingly, it is possible to measure the filling amount using the measuring unit. In addition, since the volume of the measuring space is larger than the pipeline, it is possible to reduce the static pressure applied to the dispenser. Further, by connecting to the dispenser at the upper end portion of the measuring space, the static pressure of the measuring space is effectively not applied to the dispenser, and by shutting off the inflow side of the measuring space using an inlet valve or the like, it is possible to suppress the effect of the static pressure upstream of the measuring space. This means that although the static pressure in the pipeline that connects the measuring space and the dispenser, the static pressure inside the dispenser, and the pressure difference due to the reduction in pressure are effectively applied to the discharge nozzle, the sum of such pressures is only substantially equal to the pressure loss when the electrolyte flows in the pipeline and the dispenser. Accordingly, it is possible to easily control the turning on and off of the electrolyte.

In addition, since the upper end portion of the measuring space is connected to the dispenser, it is difficult for gas that is a compressible fluid to accumulate inside the measuring space. Accordingly, it is possible to suppress dispersion of electrolyte, which contributes to improving the filling precision.

In addition, this filling apparatus is equipped with a back pressure valve on the first pipeline that connects the upper end portion of the measuring space of the measuring unit and the dispenser. By moving the piston inside the measuring space to apply a predetermined back pressure to the back pressure valve, it is possible to precisely discharge an amount of electrolyte corresponding to movement of the piston from the front end of the discharge nozzle. Also, the rise in pressure at the outlet (dispenser side) of the back pressure valve due to movement of the piston is small. Accordingly, it is easy to control the filling amount according to the movement of the piston and the shutting off of the electrolyte is improved. This means that it is possible to improve the filling precision and to reduce the filling time.

By setting or configuring the back pressure valve so as to resist the static pressure of the first pipeline upstream of the back pressure valve, when injecting, the back pressure valve will open immediately when the piston is operated and the back pressure valve will close immediately when the operation of the piston is stopped.

In addition, since the pressure difference at the discharge nozzle is small, by also closing the needle valve together with the stopping of the operation of the piston, the shutting off of the electrolyte is significantly improved. Accordingly, it is possible to provide an apparatus and method where fine filling precision can be achieved and it is easy to reduce the filling time.

In this apparatus, the first direction in which the piston moves is typically the up-down direction. This apparatus should preferably also include an inlet valve that turns a flow of the electrolyte into the measuring space on and off and a second pipeline that fluidly connects the inlet valve to the lower end portion of the measuring space. It is also preferable for the supplying of the electrolyte to include opening the inlet valve and operating the piston to have the electrolyte flow via the second pipeline into the measuring space from the lower end portion of the measuring space and closing the inlet valve before the injecting. By moving the piston in the up-down direction and supplying electrolyte from the lower end portion of the measuring space, it is possible to have the electrolyte flow comparatively smoothly into the measuring space and thereby suppress the production of bubbles.

A typical back pressure valve is a valve including a ball and a coil spring that biases or presses the ball. Since a back pressure valve of this type is also disposed on the first pipeline, the coil spring will be immersed in the electrolyte, which means that the coil spring rarely comes into contact with air and it is possible to prevent damage due to corrosion.

In addition, in this apparatus, the first pipeline should preferably extend to at least a vicinity of the lower end portion of the measuring space and the back pressure valve should preferably be disposed at a position on the first pipeline that corresponds to the vicinity of the lower end portion of the measuring space. Due to the back pressure valve, it is possible to suppress the application of the static pressure from upstream of the back pressure valve, that is, static pressure corresponding to the measuring space, onto the dispenser. Accordingly, it is possible to further improve the shutting off of electrolyte, easy to maintain the filling precision, and easy to reduce the filling time.

In this apparatus, the dispenser should preferably include a syringe that has the discharge nozzle attached to a lower end thereof and extends in the up-down direction; and a valve control rod that passes through the syringe in the up-down direction and enables the actuator to move the needle valve up and down. The first pipeline is preferably including L shaped part, one end portion of the part being connected to a side of the syringe, another end portion of the part being connected to the upper end portion of the measuring space, and the back pressure valve being disposed at a corner part. This arrangement is one preferred embodiment of the apparatus according to the present invention.

Also, in this case, to favorably supply electrolyte into the battery case disposed inside the reduced pressure chamber, it is preferable for the syringe of the dispenser to extend downward beyond the lower end of the measuring space. It is also preferable for the back pressure valve to be disposed at a part of the first pipeline that extends up and down and is in the vicinity of the corner part. This is especially preferable if the back pressure valve is a valve including a ball and a coil spring that presses the ball for biasing. Since it is possible to have the coil spring operate in the up-down direction by disposing the back pressure valve in a part of the first pipeline that extends up and down, the function (operation) as a valve can be made more stable.

DETAIL DESCRIPTION

Figure 1:
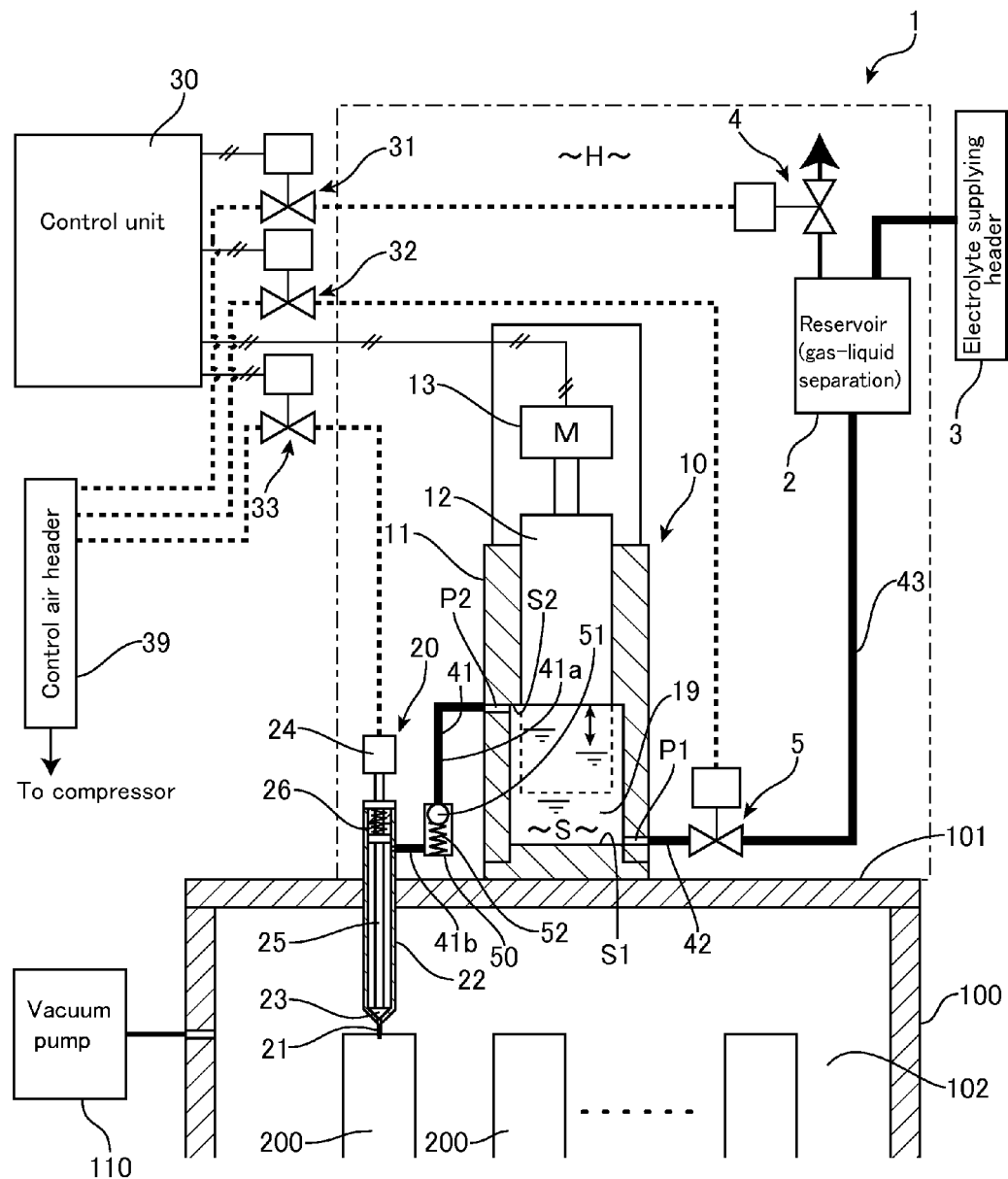
FIG. 1 is a diagram showing the outline of an electrolyte supplying apparatus (filling apparatus) according to an embodiment of the present invention.

FIG. 1 shows the outline of an apparatus according to an embodiment of the present invention. This apparatus 1 is a system (electrolyte supplying apparatus, filling apparatus, injecting apparatus) that supplies (fills, injects) electrolyte (liquid electrolytes, electrolytic solution) 19 into a battery case (vessel) 200 disposed in a reduced pressure atmosphere 102 inside a decompression chamber 100. Note that in the following description the system 1 is referred to as the "filling apparatus". The inside of the decompression chamber 100 is reduced to a specified pressure (negative pressure) by a vacuum pump 110.

The filling apparatus 1 includes a measuring unit 10 disposed on a top wall (ceiling plate) 101 of the decompression chamber 100, a reservoir (reservoir tank) 2 disposed upstream of the measuring unit 10, a dispenser 20 disposed downstream of the measuring unit 10, and a control unit 30 that controls injection of the electrolyte 19 by the filling apparatus 1. A typical control unit 30 is equipped with hardware resources including a CPU and a memory, controls the filling apparatus 1 by executing a program (program product) and supplies the electrolyte 19 to a battery case 200 during the manufacturing process of a battery.

In FIG. 1, the thick lines show flow paths ("pipelines") of the electrolyte 19, the thick broken lines show flow paths ("pipelines") of air used for control purposes, and the thin lines with diagonal markings show wires transmitting electrical signals used for control purposes. The electrolyte 19 includes a flammable organic solvent and the periphery of the decompression chamber 100, that is, the region in which the measuring unit 10 of the filling apparatus 1 is installed, is normally included within an explosion-proof region (hazardous area) H.

The reservoir 2 upstream of the measuring unit 10 is connected to a header 3 of an electrolyte supplying means and temporarily holds an amount of electrolyte equivalent to several times of the divided filling operations by the measuring unit 10. The reservoir 2 is a buffer between the header 3 and the measuring unit 10 and is provided to cover for a situation where the consumption of the measuring unit 10 temporarily exceeds the supplying capacity of the header 3. Accordingly, the measuring unit 10 is capable of operating at high speed. The reservoir 2 also serves as a gas-liquid separating mechanism, with it being possible to discharge air that accumulates at the upper part of the reservoir 2 via a venting valve 4. To prevent explosion, an air-operated valve (air-driven valve) is used as the venting valve 4 and is controlled via control air by a first solenoid valve 31 and the control unit 30 provided outside the hazardous region H. Note that the control air is supplied via a control air header 39 connected to a compressor.

The measuring unit 10 includes a cylinder 11 and a piston 12. The cylinder 11 extends in the up-down direction and the piston 12 moves in the up-down direction (the perpendicular direction or "first direction") inside the cylinder. As shown by the thin broken lines, the region where the piston 12 moves inside the cylinder 11 forms a measuring space S, and by controlling the movement (stroke) of the piston 12, it is possible to freely control (adjust) the amount of the electrolyte 19 measured by the measuring space S.

The measuring unit 10 also includes a servo motor 13 that drives the piston 12 up and down. By controlling the angle of rotation, the rotational speed, and the direction of rotation of the servo motor 13 using the control unit 30, it is possible to change the stroke of the piston 12 and to drive the piston 12 up and down. For example, by using a stepping motor as the servo motor 13 and carrying out pulse control, it is possible to carry out variable volume control with high resolution. It is also possible to use a plunger pump whose stroke can be variably controlled as the measuring unit 10.

The filling apparatus 1 includes the inlet valve 5 that opens and closes to turn the flow of the electrolyte 19 into the measuring space S of the measuring unit 10 on and off. The inlet valve 5 is connected (fluidly connected) to an inlet port P1 provided at a lower end portion S1 of the measuring space S of the measuring unit 10 by a pipeline (second pipeline) 42. The inlet valve 5 is disposed in the vicinity of the inlet port P1 and, by minimizing the length of the second pipeline 42, prevents a drop in the measuring precision of the measuring space S. The inlet valve 5 and the reservoir 2 are connected by a pipeline (third pipeline) 43. Since the inlet valve 5 is located inside the hazardous region H, an air-operated valve (air-driven valve) is also used as the inlet valve 5 which is controlled via control air by a second solenoid valve 32 and the control unit 30 provided outside the hazardous region H.

The filling apparatus 1 includes the dispenser 20 that injects the electrolyte 19 from above into a battery vessel (case, package) 200. The dispenser 20 includes a discharge nozzle 21 disposed inside a battery case 200 or near the upper end of a battery case 200, a tube (cylinder or syringe, hereinafter "syringe") 22 that has the discharge nozzle 21 attached to a lower end thereof, a needle valve 23 that is disposed inside the discharge nozzle 21 and opens and closes the front end of the discharge nozzle 21, a valve control rod 25 provided so as to pass through the inside of the syringe 22 in the up-down direction, and an air-driven actuator 24 that drives the needle valve 23 up and down via the valve control rod 25 to control opening and closing of the needle valve 23. The needle valve 23 is normally off (normally closed) and includes means (for example, a coil spring) 26 for energizing the needle valve 23 via the valve control rod 25 toward the front end of the discharge nozzle 21.

The syringe 22 extends in the up-down direction through the top wall 101 of the decompression chamber 100 and the front end (leading end) of the syringe 22 reaches a battery vessel 200 disposed on the inside 102 of the decompression chamber 100. Accordingly, the periphery of the discharge nozzle 21 that forms the front end (lower end) of the syringe 22 is in a reduced pressure atmosphere. The lower end of the syringe 22 extends downward beyond the lower end portion S1 of the measuring space S of the measuring unit 10 disposed above the top wall 101.

The valve control rod 25 passes through the inside of the syringe 22 and a part of the syringe 22 along the valve control rod 25 is a space through which the electrolyte 19 flows. Accordingly, by selecting a valve control rod 25 with an appropriate outer diameter for the inner diameter of the syringe 22, it is possible to adjust the cross-section area of the pipeline that reaches from the measuring unit 10 to the discharge nozzle 21 at the front end of the syringe 22. This means that by selecting a syringe 22 with an appropriate inner diameter and a valve control rod 25 with an appropriate outer diameter, it is possible to control the pressure loss from the measuring unit 10 to the discharge nozzle 21 in keeping with injection conditions such as the viscosity of the electrolyte 19, the internal pressure (negative pressure) of the decompression chamber 100, and the flow rate of the electrolyte 19. Accordingly, by using the construction described above, it is possible to set conditions that enable the electrolyte 19 to be smoothly injected into the battery vessel 200.

The valve control rod 25 is used to move the needle valve (cut valve) 23, which opens and closes the inside of the discharge nozzle 21, up and down by the actuator 24. The front end (lower end) of the valve control rod 25 is connected to the needle valve 23 and the other end (upper end) is connected to the actuator 24. The needle valve 23 is set so as to be normally off using the coil spring 26. The actuator 24 is air driven and by supplying control air by way of a third solenoid valve 33, the needle valve 23 is turned on (opened), and by discharging the control air, the needle valve 23 is turned off (closed). By closing the space directly above the discharge nozzle 21 using the needle valve 23 provided inside the syringe 22, it is possible, even if the discharge nozzle 21 faces a reduced pressure atmosphere, to suppress leaking of the electrolyte 19 from the discharge nozzle 21 and to improve the shutting off of the discharge nozzle 21.

The dispenser 20 is connected (fluidly connected) by a pipeline (first pipeline) 41 to an outlet port P2 provided at an upper end portion S2 of the measuring space S of the measuring unit 10. The first pipeline 41 includes a first part 41a that extends in the perpendicular (up-down) direction at least as far as the lower end portion of the measuring space S and a second part 41b that extends in the horizontal direction from the lower end of the first part 41a toward an upper end of the dispenser 20. That is, the first pipeline 41 is formed in an overall L shape, one end of the L shape part that extends horizontally (i.e., the end of the second part 41b) is connected to the side of the syringe 22 and the other end of the L shape part that extends vertically (perpendicularly) (i.e., the end of the first part 41a) is connected to the upper end portion S2 of the measuring space S.

A back pressure valve 50 is disposed at a position midway on the first pipeline 41 that corresponds to the periphery of the lower end portion of the measuring space S. In the present embodiment, the back pressure valve 50 is disposed at the corner part of the first pipeline 41 where the first part 41a and the second part 41b are met and on the first part 41a that extends in the up-down direction.

The back pressure valve 50 includes a ball 51 and a coil spring 52 that presses or biases the ball 51 upward to keep the back pressure valve 50 off (closed). The coil spring 52 is set so as to apply sufficient pressure to the ball 51 to prevent the electrolyte 19 from leaking via the back pressure valve 50 so long as the piston 12 of the measuring unit 10 does not operate (that is, performs a stroke, which in this case is downward movement). For example, the coil spring 52 is set so that the electrolyte 19 does not leak even when a pressure difference between the maximum negative pressure (degree of vacuum) in the reduced pressure chamber (decompressed chamber) 102 and atmospheric pressure is applied as a back pressure. The back pressure valve 50 also acts as a check valve in an abnormal state where the internal pressure of the syringe 22 has risen above the internal pressure of the measuring space S due to the negative pressure of the reduced pressure chamber 102 breaking and reaching atmospheric pressure or conversely due to pressure being applied.

Figure 2:
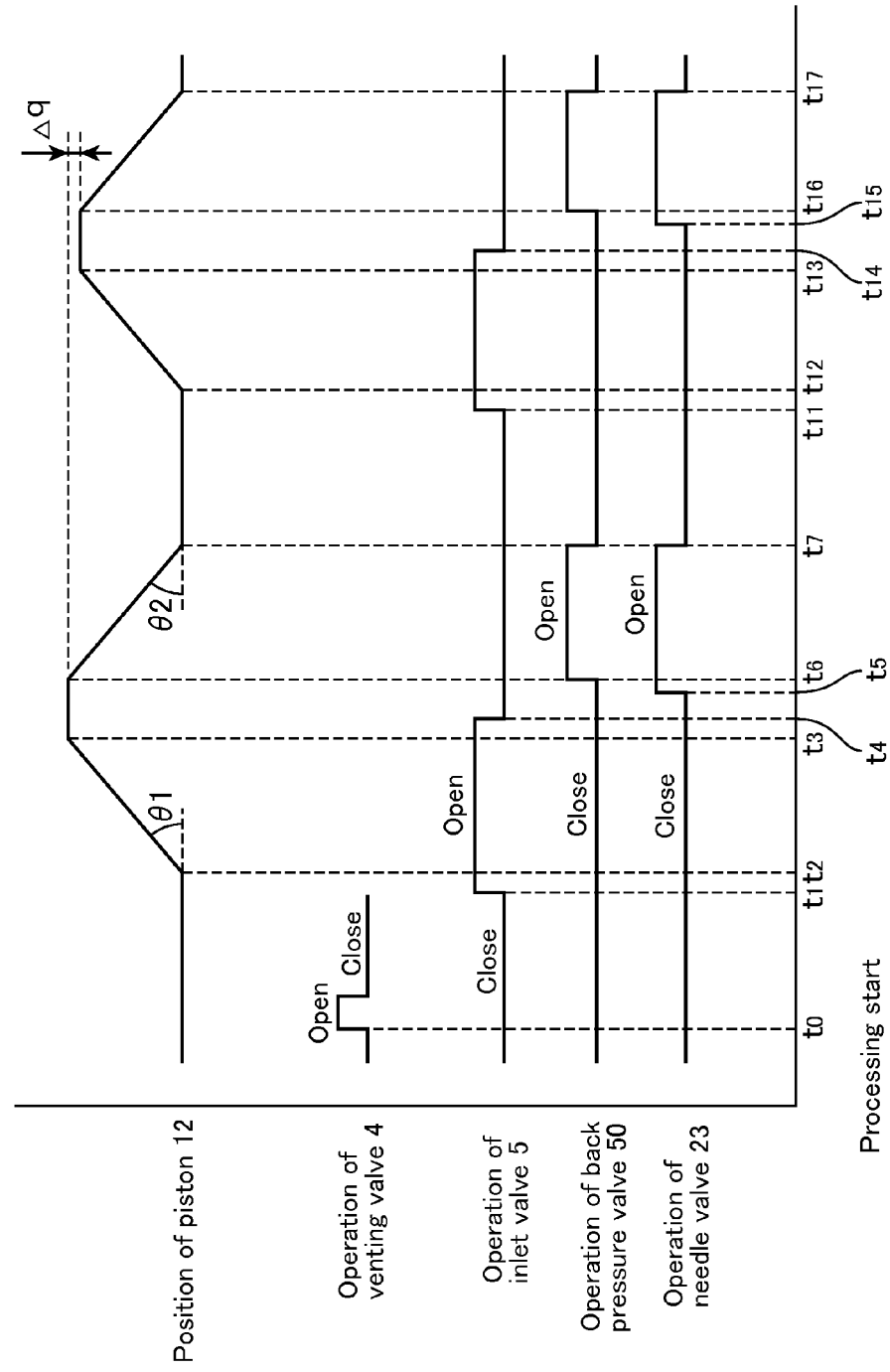
FIG. 2 is a timing chart showing the operation of the filling apparatus.

FIG. 2 shows one example of a method where the filling apparatus 1 supplies the electrolyte 19 to a battery case 200 according to control by the control unit 30 during the manufacturing of batteries. In this example, the filling apparatus 1 injects the electrolyte 19 into the battery vessel 200 split into a plurality of operations (dispensing, divided filling, divided injection). First, at time t0 at the start of dispensing (divided filling), the venting valve 4 first opens and closes to vent the reservoir 2.

At time t1, the inlet valve 5 opens to connect the reservoir 2 and the measuring space S of the measuring unit 10 in a state where the needle valve (cut valve) 23 is closed. At time t2, the stroke (movement upwards) of the piston 12 starts, and at time t3, by stopping the stroke, a predetermined amount of the electrolyte 19 is caused to flow inside the measuring space S (a step of causing the electrolyte to flow into the measuring space). During the upward stroke of the piston 12, a back pressure capable of opening the back pressure valve 50 is not applied to the back pressure valve 50 and the back pressure valve 50 therefore remains in the closed state.

In the filling apparatus 1, since the movement of the piston 12 is subjected to pulsed control via the servo motor 13, the movement speed (rate of movement, rate of travel or travel speed) of the piston 12 is variable. This means that it is possible to freely change the angle θ1 showing the drawing speed (suction rate) of the electrolyte 19 in FIG. 2. Accordingly, in a condition where the characteristics of the electrolyte 19, the drawing conditions (suction condition), and the like make it possible to raise the drawing angle θ1, it will be possible to increase the drawing speed θ1 and thereby reduce the filling time.

When the electrolyte 19 is drawn into the measuring space S, as the piston 12 moves upward in the measuring space S, the electrolyte 19 flows via the inlet valve 5 and the second pipeline 42 into the measuring space S from the inlet port P1 at the lower end portion S1. Accordingly, since the movement of the piston 12 is away from the inlet port P1 through which the electrolyte 19 flows, the electrolyte 19 flows comparatively smoothly into the measuring space S in a state that does not tend to produce turbulence. This means that gas-liquid separation does not tend to occur in the measuring space S.

After the stroke of the piston 12 has stopped, at time t4 the inlet valve 5 closes (a step of closing the inlet valve). After the inlet valve 5 has closed, at time t5, the needle valve 23 opens (a step of opening the needle valve). Since the inlet valve 5 is closed, the measuring space S is shut off from the flow path upstream of the inlet valve 5 and static pressure of the flow path upstream that includes the reservoir 2 is not applied to the measuring space S. Accordingly, it is possible to prevent static pressure upstream of the measuring unit 10, that is, of the system located upstream from the inlet valve 5, from being applied to the needle valve 23.

The cross-sectional area of the measuring space S constructed by the cylinder 11 and the piston 12 is at least ten times bigger than the cross-sectional area of the pipes, and is normally hundreds or thousands of times larger. Accordingly, by first storing the electrolyte 19 used for the divided filling (dispensing) in the measuring space S that has a large cross-sectional area, it is possible to minimize the static pressure (i.e., the pressure produced by a liquid column) applied to the needle valve 23 due to the electrolyte 19 used for the divided filling. In addition, in the filling apparatus 1, the pressure applied to the needle valve 23 is further suppressed by the back pressure valve 50.

After the needle valve 23 has opened, at time t6 the stroke (downward movement) of the piston 12 starts. The back pressure valve 50 is provided on the first pipeline 41 that connects the upper end portion S2 of the measuring space S of the measuring unit 10 and the dispenser 20. This means that when supplying the electrolyte 19 to a battery vessel 200, no electrolyte 19 will be discharged even if the needle valve 23 of the discharge nozzle 21 of the dispenser 20 is open at time t5. At time t6, due to the piston 12 moving and a predetermined back pressure being applied to the back pressure valve 50, the back pressure valve 50 opens and an amount of the electrolyte 19 corresponding to the movement of the piston 12 is precisely discharged from the front end of the discharge nozzle 21 (a step of injecting the electrolyte).

Also, the first pipeline 41 on which the back pressure valve 50 is provided is connected to the outlet port P2 of the upper end portion S2 of the measuring space S and the static pressure (the pressure produced by a liquid column) applied to the outlet port P2 will fundamentally be zero and will not fluctuate even if the position (position in the up-down direction) of the piston 12 changes. Accordingly, only the static pressure of the electrolyte 19 inside the first pipeline (tube) 41 upstream of the back pressure valve 50 and the pressure due to the movement (downward stroke) of the piston 12 is applied to the back pressure valve 50. Since the static pressure (pipeline static pressure) of the electrolyte 19 inside the first pipeline 41 upstream of the back pressure valve 50 is constant, by setting the back pressure valve 50 so as to be capable of resisting the static pressure on this pipeline or a slightly higher pressure than such static pressure on the pipeline, the back pressure valve 50 can react instantaneously (immediately) to movement of the piston 12 and open (a step of immediately opening the back pressure valve).

Accordingly, once the piston 12 stops the stroke at time t7, the measuring unit 10 and the dispenser 20 can be separated (in terms of pressure) by the back pressure valve 50 in an extremely short time which is substantially instantaneously (a step of closing the back pressure valve, a step of immediately closing the back pressure valve). This means that even if the front end of the dispenser 20 is placed in a reduced pressure (vacuum) state, it is possible to completely prevent a state where the electrolyte 19 in the measuring space S is drawn by the low pressure and flows out in large amounts.

In the filling apparatus 1, since the movement of the piston 12 is subjected to pulsed control via the servo motor 13, the movement speed of the piston 12 can be varied. Therefore, it is possible to arbitrarily change the angle 82 showing the discharge speed (discharge rate) of the electrolyte 19 in FIG. 2 independently of the drawing speed 81. This means that it is possible to make the discharge speed 82 slower than the drawing speed 81 or to make the discharge speed 82 faster than the drawing speed 81 according to the characteristics of the electrolyte 19, the drawing conditions, and the like. For this reason, in a condition where the discharge speed 82 can be increased, it is possible to further reduce the filling time. It is also possible to reduce the discharge speed 82 relative to the drawing speed 81 and further improve the shutting off of the needle valve 23 and/or ensure sufficient infiltration time for the electrolyte 19 inside the battery case 200.

To instantaneously open and close the back pressure valve 50 according to variations in pressure, it is preferable to apply a certain constant back pressure to the back pressure valve 50. For this reason, in the filling apparatus 1, the first pipeline 41 is L-shaped in form, the back pressure valve 50 is installed on the perpendicularly (vertically) extending part at the corner portion, and the static pressure of the upper part of the first pipeline 41 is constantly applied to the back pressure valve 50 as a constant back pressure. In addition, the coil spring 52 of the back pressure valve 50 extends in the perpendicular direction and is disposed in a state where mechanical friction is unlikely to be produced between the coil spring 52 and the pipe or the valve case. Accordingly, this also makes it possible for the back pressure valve 50 to sensitively turn on and off in keeping with (depending on) the movement (stroke) of the piston 12.

Also, by disposing the back pressure valve 50 inside the pipeline of the first pipeline 41, the ball 51 and the coil spring 52 of the back pressure valve 50 will be continuously immersed in the electrolyte 19. For this reason, since the ball 51 and the coil spring 52 are not exposed to air, there will be little corrosion of the ball 51 and the coil spring 52 due to the constituents of the electrolyte 19 and constituents of air, and little adhesion of deposits to the ball 51 and the coil spring 52. This means that the operation of the back pressure valve 50 is stabilized and the back pressure valve 50 is capable of sensitively opening and closing in keeping with the movement (stroke) of the piston 12. Accordingly, it is possible to control the amount of electrolyte 19 supplied to the dispenser 20 by the movement of the piston 12 of the measuring unit 10 extremely precisely.

At time t7 where a specified amount of the electrolyte 19 has been measured, the stroke of the piston 12 is stopped. Together with this (at the same time), the needle valve 23 is closed (a step of closing the needle valve). By closing the needle valve 23, it is possible to prevent the electrolyte 19 from leaking out from the discharge nozzle 21 of the dispenser 20. Accordingly, at time t7 it is possible to end the measuring in the measuring unit 10 and via the needle valve 23 to also stop injection into the battery case 200 from the dispenser 20, which means it is possible to prevent leaking from the discharge nozzle 21.

Together with the piston 12 stopping at time t7, the back pressure valve 50 operates to shut off the static pressure upstream of the back pressure valve 50. This means that the pressure difference applied to the needle valve 23 is reduced. Accordingly, by closing the needle valve 23 at the same time or with only a very slight time difference, it is possible to easily shut off the electrolyte 19 with the needle valve 23, which makes it possible to improve the shutting off the liquid electrolytes. This means that it is possible to improve the filling precision (dispensing precision) of the filling apparatus 1. In addition, since it is fundamentally unnecessary to wait a certain time for dripping to stop, it is also possible to reduce the filling time.

In addition, since the outlet port P2 connected to the first pipeline 41, on which the back pressure valve 50 is installed, is provided at the upper end portion S2 of the measuring space S, gas does not tend to accumulate in the measuring space S. Even if the electrolyte 19 inside the measuring space S is in a state where gas-liquid separation can occur, since a liquid layer in a state immediately preceding gas-liquid separation will be discharged together with or as the electrolyte 19 from above the measuring space S before bubbles can be formed, bubbles do not tend to be produced in the measuring space S. If bubbles are produced, since gases are compressible, this affects the measurement precision of the measuring space S and if the gas expands due to a reduction in pressure, dispersion of the electrolyte 19 from the discharge nozzle 21 of the dispenser 20 is caused. Accordingly, since it is difficult for bubbles to be produced in the measuring space S in the filling apparatus 1, it is possible to maintain the measuring precision, that is, the filling precision, to also prevent dripping, and to also completely prevent a situation where the electrolyte 19 becomes dispersed inside the reduced pressure chamber 102.

When a plurality of battery cases 200 have been set inside the reduced pressure chamber 102, the battery cases 200 and the dispenser 20 are moved relative to one another and by moving the next battery case 200 under the dispenser 20, divided filling (dispensing) is successively carried out for the plurality of battery cases 200 by the filling apparatus 1. In this case, with the filling apparatus 1, the electrolyte is effectively shut off, very little wait time is required for dripping to stop, and there is almost no dispersion from the discharge nozzle 21. Accordingly, it is possible to start the next divided filling operation with almost no wait time. That is, once the divided filling into a preceding battery case 200 has been completed at time t7, after leaving enough time for movement or transferring of the battery cases 200, the inlet valve 5 is opened at time t11, the (upward) stroke of the piston starts at time t12, and after this divided filling can be repeatedly carried out in the same way as the cycles described above.

In addition, since there are fundamentally no leaks from the end of the discharge nozzle 21, it is possible to use the period while the measuring unit 10 is measuring, that is, until time t13 or time t14 as the movement or travel time for the battery cases 200. Accordingly, it is possible to further reduce the filling time. Since it is also possible to change the drawing speed 81, it is also possible to set the movement time of the piston 12 in synchronization with the movement time or transferring time of the battery vessels 200.

In the filling apparatus 1, by adjusting the stroke of the piston 12 of the measuring unit 10, it is possible to adjust the filling amount (divided filling amount, dispensing measure) with almost complete freedom. For example, in FIG. 2, by reducing the time t12 to t13 of the stroke of the piston 12 in a following cycle compared to the time t2 to t3 of the stroke of the piston 12 in a first cycle, it is possible to reduce the filling amount by $\Delta q$. Accordingly, the filling apparatus 1 is capable of coping extremely flexibly with a variety of patterns for divided filling, and also has high filling precision and is capable of reducing the time required by divided filling.

Also, the step of introducing (drawing) electrolyte into the measuring space and the step of injecting the electrolyte do not need to correspond on a one-to-one basis and after the electrolyte 19 has been introduced into the measuring space S, it is possible to inject the electrolyte 19 into the battery vessel 200 divided into a plurality of operations.

Note that although the measuring unit 10 described above is a type where the cylinder 11 extends in the up-down direction and the piston 12 moves in the up-down direction, it is also possible to use a type where the cylinder 11 is disposed so as to extend in the left-right direction (horizontal direction) and the piston 12 moves in the left-right direction (horizontal direction). In such configuration, although it is necessary to arrange the pipes so that the electrolyte 19 can smoothly flow into and out of the measuring space S, since the dimension in the up-down direction can be reduced, this is suited to a more compact filling apparatus.

Also, although the measuring unit 10 described above is driven by a servo motor, the driving method is not limited to a servo motor. If precision of vary the filling amount is not required, it is also possible to drive the piston using a solenoid type actuator. In addition, although the inlet valve, the venting valve, and the needle valve described above all use air-operated actuators out of consideration to the hazardous region, if the periphery is not a hazardous region, it is also possible to use a solenoid valve or a solenoid-type actuator, with it also being possible to use a variety of types as the actuator. In the apparatus (system) described above, a ball-type back pressure valve is favorable since it can be easily incorporated on a pipe and has stable operation, but it is also possible to use another type, such as a diaphragm type.

The invention claimed is:
1. A method comprising supplying electrolyte inside a battery case disposed inside a reduced pressure chamber using a supplying apparatus including a measuring unit where a piston moves along a first direction in a measuring space inside a cylinder, the supplying apparatus including:

a dispenser that injects electrolyte from above into a battery case;

a first pipeline that connects an upper end portion of the measuring space of the measuring unit and the dispenser; and a back pressure valve disposed on the first pipeline, the dispenser including:

a discharge nozzle disposed inside the battery case or in a periphery of an upper end of the battery case; and a needle valve that is disposed inside the discharge nozzle and opens and closes the discharge nozzle, and the supplying electrolyte including:

injecting, with a control unit driving the piston to apply a back pressure to the back pressure valve, electrolyte from the upper end portion of the measuring space via the back pressure valve of the first pipeline and the needle valve into the battery case inside the reduced pressure chamber; and closing, with stopping the piston, the back pressure valve.

2. The method according to claim 1, wherein the back pressure valve is configured so as to resist a static pressure of the first pipeline upstream of the back pressure valve, the injecting includes the back pressure valve immediately opening when the piston is driven, and closing the back pressure valve includes the back pressure valve immediately closing when the operation of the piston stops.

3. The method according to claim 2, wherein the supplying electrolyte further includes closing the needle valve when the operation of the piston stops.

4. The method according to claim 1, wherein the supplying apparatus further includes an inlet valve that turns a flow of electrolyte into the measuring space on and off and a second pipeline that connects the inlet valve and a lower end portion of the measuring space, and the supplying electrolyte includes:

the control unit opening the inlet valve and driving the piston to cause the electrolyte to flow via the second pipeline into the measuring space from the lower end portion of the measuring space; and closing the inlet valve before the injecting.

5. An apparatus supplying electrolyte inside a battery case disposed inside a reduced pressure chamber, comprising:

a measuring unit where a piston moves along a first direction in a measuring space inside a cylinder;

a dispenser that injects electrolyte from above into a battery case;

a first pipeline that connects an upper end portion of the measuring space of the measuring unit and the dispenser; and a back pressure valve disposed on the first pipeline, wherein the dispenser includes:

a discharge nozzle disposed inside the battery case or in a periphery of an upper end of the battery case;

a needle valve that is disposed inside the discharge nozzle and opens and closes the discharge nozzle; and an actuator that drives the needle valve up and down.

6. The apparatus according to claim 5, wherein the dispenser includes a syringe that includes the discharge nozzle attached to a lower end thereof and extends in the up-down direction; and a valve control rod that passes through the cylinder in an up-down direction and enables the actuator to move the needle valve up and down, and the first pipeline includes an L-shaped part, one end portion of the part being connected to a side of the syringe, another end portion of the part being connected to the upper end portion of the measuring space, and the back pressure valve being disposed at a portion near a corner of the part that extends up and down.

7. The apparatus according to claim 6, wherein the syringe extends downward beyond a lower end portion of the measuring space.

8. The apparatus according to claim 5, wherein the first pipeline extends to at least a vicinity of the lower end portion of the measuring space and the back pressure valve is disposed at a position on the first pipeline that corresponds to the vicinity of the lower end portion of the measuring space.

9. The apparatus according to claim 5, wherein the first direction is the up-down direction, and the apparatus further comprises:

an inlet valve that turns a flow of electrolyte into the measuring space on and off; and a second pipeline that connects the inlet valve and a lower end portion of the measuring space.

10. The apparatus according to claim 5, wherein the back pressure valve is a valve including a ball and a coil spring that biases the ball.

11. The apparatus according to claim 5, wherein the first pipeline extends to at least a vicinity of the lower end portion of the measuring space and the back pressure valve is disposed at a position on the first pipeline that corresponds to the vicinity of the lower end portion of the measuring space, and wherein the first pipeline includes an L-shaped part and the back pressure valve being disposed at a portion near a corner of the an L-shaped part that extends up and down.

* * * * *